April 6, 1926.

B. C. MOLL

SWITCH FOR AUTOMOBILE SIGNALS

Filed Jan. 7, 1924

1,579,559

Witness:
Chas. R. Kourek

Inventor
Bernhard C. Moll,
By
Offield, Bulkley, Poole & Scott
Attys.

Patented Apr. 6, 1926.

1,579,559

UNITED STATES PATENT OFFICE.

BERNHARD C. MOLL, OF CHICAGO, ILLINOIS.

SWITCH FOR AUTOMOBILE SIGNALS.

Application filed January 7, 1924. Serial No. 684,731.

*To all whom it may concern:*

Be it known that I, BERNHARD C. MOLL, a citizen of the United States, and a resident of Chicago, in the county of Cook and State of Illinois, have invented certain new and useful Improvements in Switches for Automobile Signals, of which the following is a specification.

This invention relates to improvements in switches for automobile signal devices and more particularly to a switch designed to control a stop light signal mounted on the rear of an automobile and ordinarily operated by the foot brake.

These switches are ordinarily mounted underneath the car body near the brake rods, and connected to one of the rods or both. The function of these switches is to open and close a circuit including the stop light signal as the brakes are applied and released by the foot brakes, the light being extinguished except when the brakes are being applied.

While a switch for this purpose need not be intricate in its construction, it is highly desirable that it be made in such a way as to withstand the hard usage and exposure to which it is subjected. Being located beneath the car, it is exposed to mud and dust and therefore, if not dirt-proof, soon gives trouble or wears out. Moreover, the switch undergoes hard usage, and therefore, if not properly constructed, its life is of short duration.

The object of the present invention is to provide a useful and properly constructed switch, especially designed with a view to overcoming the defects which are present in the average switch now on the market.

A preferred embodiment of the invention is described in the accompanying drawings in which—

Figure 1:
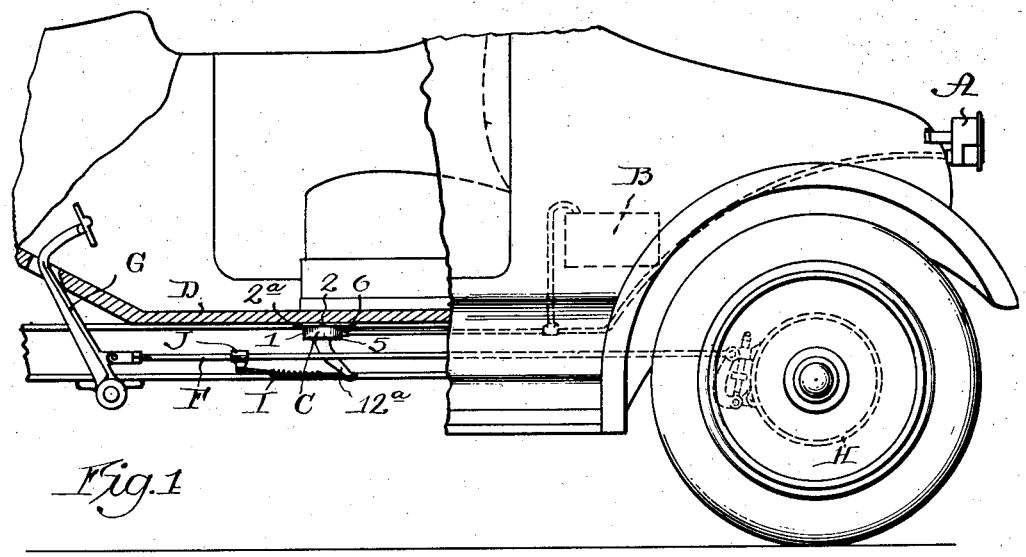
Figure 1 is a view in side elevation of a vehicle, showing the manner in which the signal device is installed and operated.

The purposes and operation of this stop signal device are so well known that a few words will suffice for explaining the disclosure of Figure 1. The stop light A is mounted at the rear of the vehicle, with its signal lamp in circuit with the storage battery B, and switch C, mounted on the underside of the floor board D of the car body and operatively connected with the brake rod F connecting the foot brake pedal G with the rear brakes H.

Figure 2:
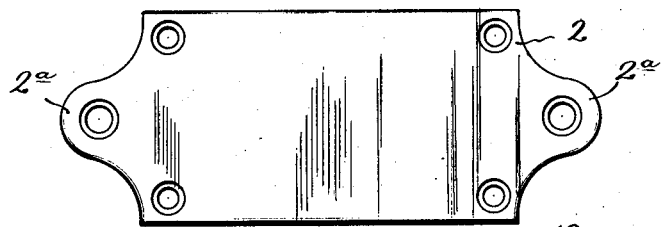
Figure 2 is a view in elevation of the cover plate of the switch casing.

The switch C indicated in Figure 1 is shown in detail in Figures 2, 3, and 4 and will now be described. The moving and contact parts of the switch are enclosed within a rectangular shaped casing 1, preferably made of some suitable insulating material, although this is not absolutely essential, providing the contact and current carrying parts are properly insulated so as not to cause ground or short circuit to the vehicle frame. The top side of the casing is open, but a removable cover plate 2 is provided, which can be fastened to the casing by means of screws passing through the corners of the plate and anchored in bosses 1ª in the upper corners of the casing. At either end of the cover plate are formed ears 2ª, 2ª, with screw holes therethrough for attaching a complete switch to the car.

Extending lengthwise of the casing and between the bottom wall 3 and the cover plate 2 is a rod 4, the ends of the rods being anchored in the end walls 5, 5. In one end wall 5 of the casing are anchored the binding posts or terminals 6, 6, having contact points 6ª, 6ª on the inside of the casing, these binding posts being located near opposite lower corners of the casing. Slidably mounted upon the rod 4 is a contact member 7, comprising a sleeve 8, carried on the rod and a depending arm 9 at the end of the sleeve nearest the binding posts 6, 6. Secured to the arm 9 is a resilient contact plate 10 arranged transversely of the arm and terminating in spring contact fingers 10ª, 10ª adapted for contact with the contact points 6ª, 6ª of the binding posts. Without going further into the structure, it is obvious that by moving the contact member toward the right Figure 3, a circuit is closed across the terminal points 6ª, 6ª, through the contact fingers 10ª, it being understood that the conductors forming the stop light circuit are attached to the binding posts. Surrounding a portion of the rod 4 between the end wall 5 of the casing in which the terminal posts 6 are mounted, and the adjacent end of the sleeve 8, is a coil spring 11 acting to resist the closing of the circuit and to exert a pressure on the sleeve to force it toward the opposite end of the casing.

Co-acting with the contact member 7 and more directly with the arm 9 thereof, is the operating lever 12, consisting of a cam 13, journalled within the casing and an arm 14 extending downwardly therefrom through a slot 15 in the bottom wall of the casing.

As clearly shown in Figure 1, the lever arm 14 extends toward the rear and is connected to the brake rod "F" by means of a coil spring I and a clamp J mounted on the brake rod.

The lever 12 is journalled on a fixed rod 16 extending transversely of the casing below the sleeve 8, and through the medium of a bearing sleeve 17 extending transversely through and turning with the cam 13. The bearing sleeve extends the full length of the rod and rotates or oscillates thereon, so that the wear is distributed throughout its entire length. Surrounding the bearing sleeve 17 is a coil spring 18 which is divided into two sections, one on each side of the lever. The central portion of the spring passes through the cam at $18^a$ while at its ends are straight portions $18^b$, $18^b$, which bear against the bottom wall of the casing and prevent the spring from turning.

Figure 3:
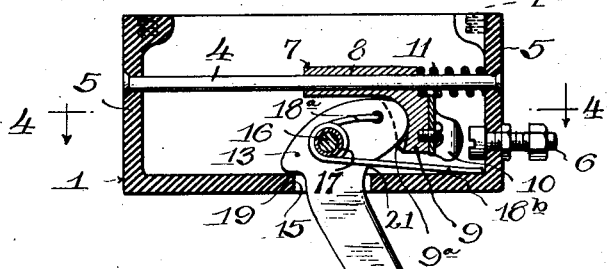
Figure 3 is a view in vertical section taken along the longitudinal axis of the switch casing.
Figure 4:
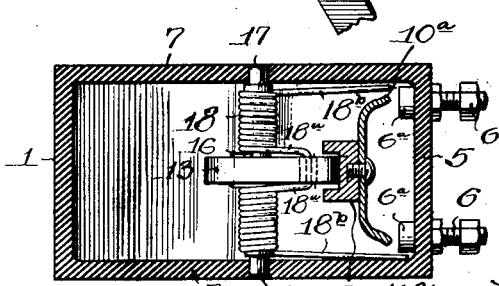
Figure 4 is a view in horizontal section taken on the line 4—4 of Figure 3.

The cam 13 of the lever 12 is oval shaped with one end engaging a cam slot or groove $9^a$ in the back side of the arm 9, said cam and groove being so arranged that the movement of the lever through a relatively small arc and in a clockwise direction, Figure 3, throws the contact member 7 forward into circuit closing contact with the contact points $6^a$, $6^a$. At the base of the cam is formed a shoulder at 19 which normally engages the bottom of the casing at one end of the slot 15, it being observed that in the open position of the switch shown in Figure 3, a passage exists between the left or rear end of the slot, and the arm 14 of the lever. However, the shoulder at 19 closes the passage so that dust and dirt cannot enter the casing. At the front or right end of the slot 15 there is contact with the lever, so that there is a closure or sealing at this point as well. Thus, in the normal position of the switch lever the shoulder acts as a stop as well as a dust proof closure between the lever and the slot. When the lever is shifted to the left, in closing the switch, the shoulder 19 is swung upwardly and out of contact, so that a closure is still provided. At the forward end of the slot, the opening formed by the shifting of the lever, is closed by the curved portion 20 just above, which is swung down along the edge of the slot, thereby providing a closure. Thus, these shoulders and adjacent portions of the lever serve as stops to limit the movement or throw of the switch as well as closures for the ends of the slot.

It is to be particularly noted that the throw or travel of the switch lever is relatively small—not over 20°, whereas in the ordinary switch it is invariably more than 90°. The short throw of the lever thus permits of a decreased opening for the entrance of dust and dirt, yet ample movement is transmitted to the sliding contact block through the cam action which transmits the required throw or displacement for opening and closing the circuit.

The throw of the switch lever as thus reduced is considerably less than the movement of the brake rod, and the coil spring I between the lever 14 and the rod F acts to take up the excess pull or displacement.

In practice the throw of the contact block is slightly greater than is required to make a contact with the points $6^a$, $6^a$, so as a result there is a slight yielding action of the spring fingers $10^a$. This is desirable in order to insure perfect contact and hence dependable operation of the signal. The material decrease in the stroke or throw of the moving parts and the provision of adequate bearing surfaces therefore reduces the wear, promotes longer life and insures positive action. These advantages combined with the dust and dirt proof features are essential in a switch for signal circuits of the kind herein described.

I claim as my invention:

1. A switch of the character described comprising a casing, terminals fixed in said casing, a contact member slidably mounted in said casing for opening and closing a circuit across said terminals, a cam in operative connection with said contact member and comprising a bearing sleeve, extending between opposite walls of said casing, and a rod fixed in said opposite walls and forming a journal bearing for said sleeve.

2. A switch of the character described, comprising a casing, terminal posts fixed in said casing, a rod supported between opposite walls of said casing, a contact member slidable on said rod, a cam journalled in said casing and engaging said contact member, an arm extending from said cam through a slot in said casing, said cam having slot engaging surfaces adapted to seal said slot in the several positions of said arm.

3. A switch of the character described, the combination of a casing, having terminals therein, a contact member slidably mounted in said casing for opening and closing a circuit through said terminals, a cam journalled in said casing and comprising a bearing sleeve, a rod extending between opposite walls of said casing and supporting said sleeve, a coil spring surrounding said sleeve and acting to turn said cam in one direction, and an arm extending from said cam, through a slot in said casing, and means for sealing said slot in the several positions of said arm.

4. A switch of the character described, comprising a casing, provided with conductor terminals, a contact member slidably mounted in said casing and provided with spring contact fingers adapted to engage said terminals, a cam mounted adjacent said contact member, and comprising a bearing sleeve, a rod extending across said casing and supporting said sleeve, and a lever arm extending through a slot in said casing.

In witness whereof, I hereunto subscribe my name this 2nd day of January, A. D., 1924.

BERNHARD C. MOLL.